United States Patent
Wee

(12) 
(10) Patent No.: US 6,254,174 B1
(45) Date of Patent: Jul. 3, 2001

(54) REINFORCEMENT STRUCTURE FOR REAR PILLAR OF AUTOMOBILES

(75) Inventor: Seong-Kae Wee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/641,925

(22) Filed: Aug. 17, 2000

(30) Foreign Application Priority Data

Dec. 31, 1999 (KR) .................................................. 99-68313

(51) Int. Cl.$^7$ ....................................................... B60J 7/00
(52) U.S. Cl. .................... 296/203.04; 296/195; 296/205; 296/203.01; 296/203.03
(58) Field of Search .............................. 296/195, 203.04, 296/205, 203.01, 203.03

(56) References Cited

U.S. PATENT DOCUMENTS

| | | | |
|---|---|---|---|
| 4,775,181 | * 10/1988 | Shoda | 296/203.04 |
| 4,875,733 | * 10/1989 | Chado et al. | 296/195 |
| 4,973,103 | * 11/1990 | Imajyo et al. | 296/195 |
| 5,022,704 | * 6/1991 | Mizuno et al. | 296/195 |
| 5,123,696 | * 6/1992 | Watari | 296/195 |
| 5,398,989 | * 3/1995 | Winter et al. | 296/205 |
| 5,855,407 | * 1/1999 | Fukuda | 296/203.04 |
| 5,941,597 | * 8/1999 | Horiuchi et al. | 296/205 |
| 6,126,232 | * 10/2000 | Nakano | 296/195 |

FOREIGN PATENT DOCUMENTS

| | | | |
|---|---|---|---|
| 0183361 | * 10/1983 | (JP) | 296/195 |
| 0226370 | * 10/1986 | (JP) | 296/195 |
| 0247577 | * 11/1986 | (JP) | 296/195 |
| 0258480 | * 10/1990 | (JP) | 296/195 |
| 0016881 | * 1/1991 | (JP) | 296/195 |

\* cited by examiner

*Primary Examiner*—Joseph D. Pape
*Assistant Examiner*—Kiran B. Patel
(74) *Attorney, Agent, or Firm*—Christie, Parker & Hale, LLP

(57) ABSTRACT

The object of the present invention is to provide a reinforcement structure for a rear pillar of automobiles. In this structure, a reinforcing panel, forming the upper portion of the rear pillar, is integrated with the welded junction between an inside upper quarter panel and a rear lower roof rail, thus forming a closed cavity within the rear pillar while maximizing the structural strength of rear roof rails. This structure thus allows the top edge of the body's rear portion, formed by the rear roof rails, to effectively and stably support a rear hatch and effectively intercepts noise transmitted from tires of wheels into the passenger compartment through the rear pillars during operation of the automobile. The reinforcing panel extends in a space defined between the inside upper quarter panel and a side panel and is integrated with the lower end of the inside upper quarter panel at its lower end. This reinforcing panel is also integrated with the upper end of the side panel at its upper end portion. The upper end portion of the reinforcing panel further extends to a position around an upper end of the inside upper quarter panel, and is integrated with the upper end of the inside upper quarter panel while forming a closed cavity within the rear pillar.

2 Claims, 5 Drawing Sheets

REINFORCEMENT STRUCTURE FOR REAR PILLAR OF AUTOMOBILES

BACKGROUND OF THE INVENTION

1. Field of the Invention

The present invention relates, in general, to rear pillars of automobiles and, more particularly, to a reinforcement structure for such a rear pillar, with a reinforcing panel of the rear pillar being integrated with the upper end of a quarter panel at its upper end, thus forming a closed cavity within the rear pillar and increasing the structural strength of the rear pillar.

2. Description of the Prior Art

As well known to those skilled in the art, a conventional automobile typically consists of a body and a chassis. The body forms a desired appearance of the automobile, with a plurality of parts having a variety of shapes and being appropriately assembled into a single body. The rear portion of an automobile body having a rear hatch T is shown in FIG. 1.

As shown in the drawing, the rear hatch T is hinged to the top edge of the rear portion of the body in a way such that the rear hatch T is rotatable around the hinged junction through a raise or lower type motion, thus being selectively opened or closed. The automobile having such a rear hatch T is also provided with two rear pillars 10 at opposite sides of the body's rear portion. FIG. 2 is a perspective view, showing the interior structure of a conventional rear pillar 10 designated by the circled portion C of FIG. 1. FIG. 3 is a sectional view taken along the line A—A of FIG. 2. As shown in the drawings, two longitudinal rear pillars 10 upwardly extend at opposite sides of the body's rear portion.

Each of the rear pillars 10 comprises an inside upper quarter panel 12 and an inside lower quarter panel 14, which extend upwardly while being integrated together into a single body at ends thereof through a welding process. A reinforcing panel 16 extends upwardly at a position outside the inside upper quarter panel 12 while being spaced apart from the quarter panel 12. The above panel 16 is integrated with the welded junction of the two quarter panels 12 and 14 at its lower end. The upper end of the reinforcing panel 16 is integrated with the upper end of a side panel 18. Both a roof panel 20 and a rear upper roof rail 22 are commonly integrated with the welded junction of both the reinforcing panel 16 and the side panel 18. A rear lower roof rail 24 extends inside the rear upper roof rail 22 while being spaced apart from the rail 22, and is integrated with the upper end of the inside upper quarter panel 12.

In the interior of each rear pillar 10, the lower end of the reinforcing panel 16 is integrated with the upper end of the inside lower quarter panel 14 as best seen in FIG. 2. On the other hand, the upper end of the reinforcing panel 16 is integrated with both the rear upper roof rail 22 and a roof side rail 26. In a brief description, the reinforcing panel 16, the rear upper roof rail 22, and the roof side rail 26 form an upper corner portion of the rear pillar 10.

In the above structure, the upper corner portion of the rear pillar 10 absorbs impact through the inside upper quarter panel 12, the reinforcing panel 16, the rear upper roof rail 22, and the roof side rail 26 when any impact is applied thereto.

However, the conventional rear pillar 10 undesirably allows noise to be transmitted from tires of wheels to the channel between the rear upper and rear lower roof rails 22 and 24 through the channel between the inside upper quarter panel 12 and the reinforcing panel 16 during operation of the automobile. Therefore, the conventional rear pillar 10 does not accomplish a desired reduction in operational noise during operation of an automobile. This makes passengers within the passenger compartment feel uncomfortable.

In addition, the lower end of the reinforcing panel 16 is integrated with the upper end of the inside lower quarter panel 14 through a welding process, and so a desired structural strength is accomplished at the lower portion of the rear pillar 10. However, the connection structure between the reinforcing panel 16 and the rear lower roof rail 24 does not have a desired strength, and so the conventional rear pillars 10 are not suitable for supporting the raise or lower type rear hatch T.

Such a problem is caused by the structural limit in that two or more hinge members (not shown), used for rotatably holding the raise or lower type rear hatch T, are mounted to the top edge of the body's rear portion formed by both the rear upper roof rail 22 and the rear lower roof rail 24. However, the two roof rails 22 and 24 do not form a desired structural strength capable of effectively supporting such hinge members.

SUMMARY OF THE INVENTION

Accordingly, the present invention has been made keeping in mind the above problems occurring in the prior art, and an object of the present invention is to provide a reinforcement structure for a rear pillar of automobiles, in which a reinforcing panel, forming the upper portion of the rear pillar, is integrated with the welded junction between an inside upper quarter panel and a rear lower roof rail, thus forming a closed cavity within the rear pillar while maximizing the structural strength of rear roof rails, and which allows the top edge of the body's rear portion, formed by the rear roof rails, to effectively and stably support a rear hatch and effectively intercepts noise transmitted from tires of wheels into the passenger compartment through the rear pillars during operation of the automobile.

In order to accomplish the above object, the present invention provides a reinforcement structure for a rear pillar of automobiles, with a reinforcing panel extending in a space defined between an inside upper quarter panel and a side panel and integrated with the lower end of the inside upper quarter panel at its lower end, and integrated with the upper end of the side panel at its upper end portion, wherein the upper end portion of the reinforcing panel further extends to a position around an upper end of the inside upper quarter panel and is integrated with the upper end of the inside upper quarter panel while forming a closed cavity within the rear pillar.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
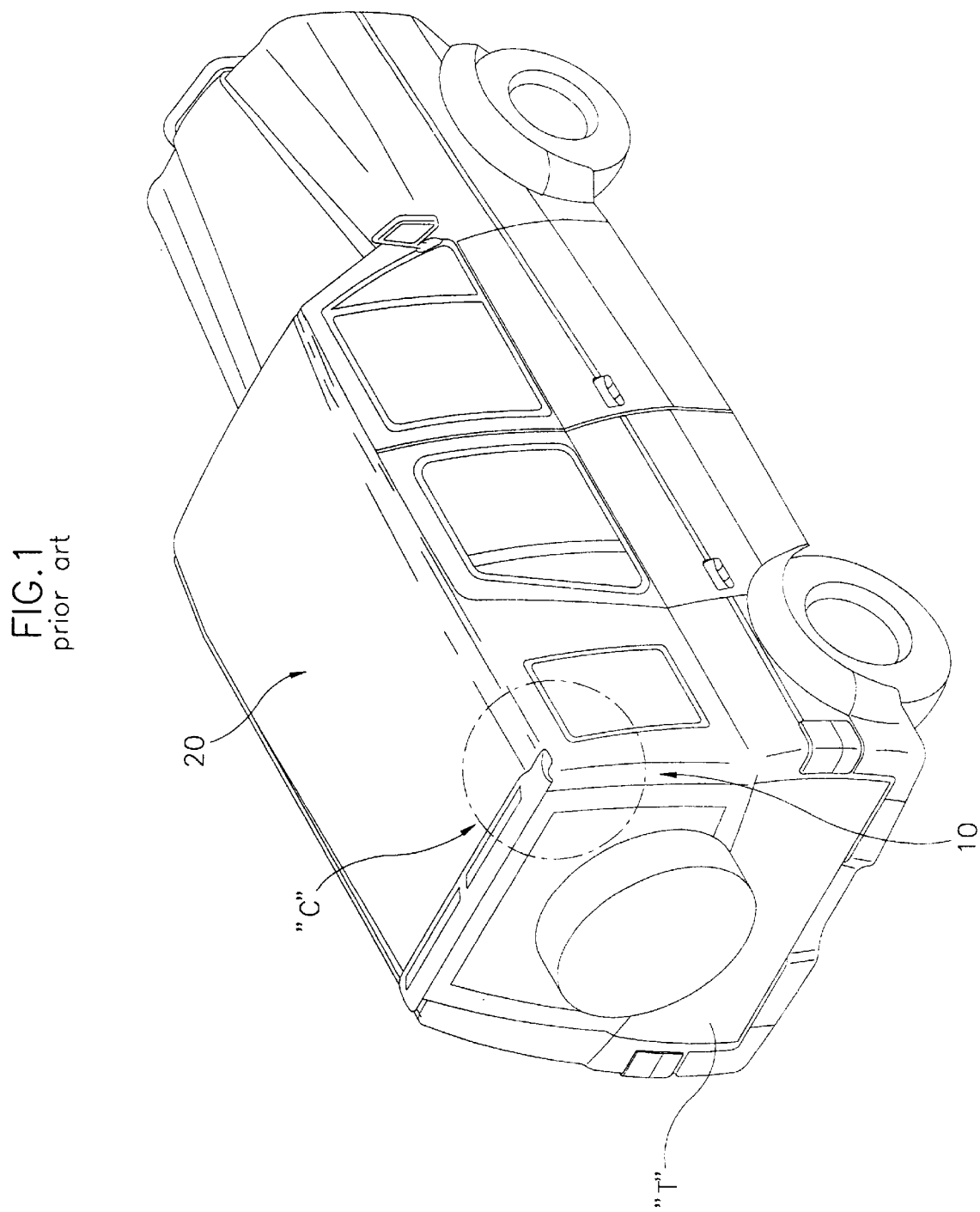
FIG. 1 is a perspective view of the body of an automobile having a conventional rear hatch.
Figure 2:
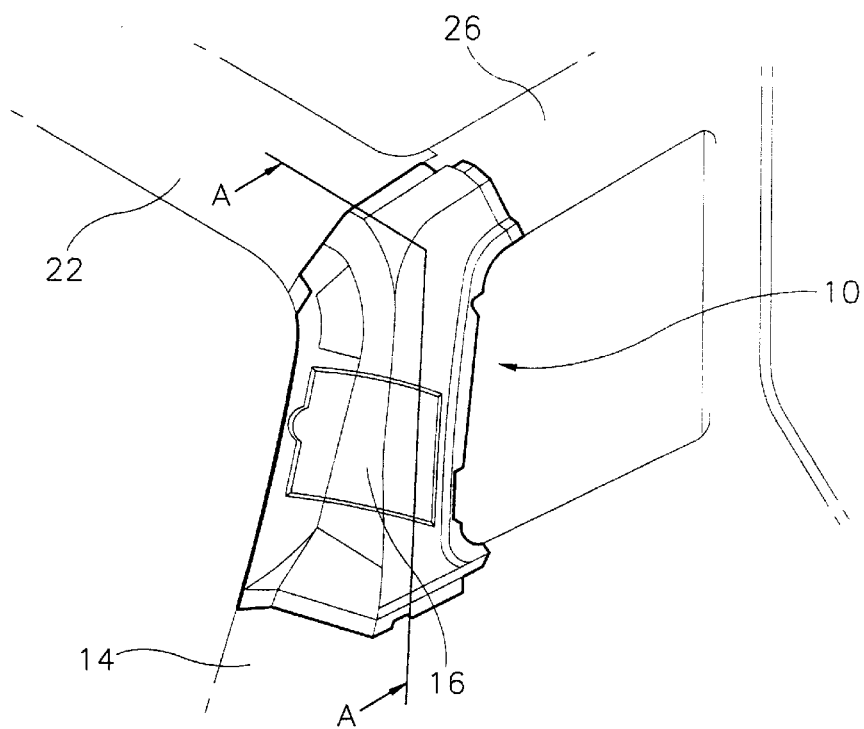
FIG. 2 is a perspective view, showing the interior structure of a conventional rear pillar designated by the circled portion C of FIG. 1.
Figure 4:
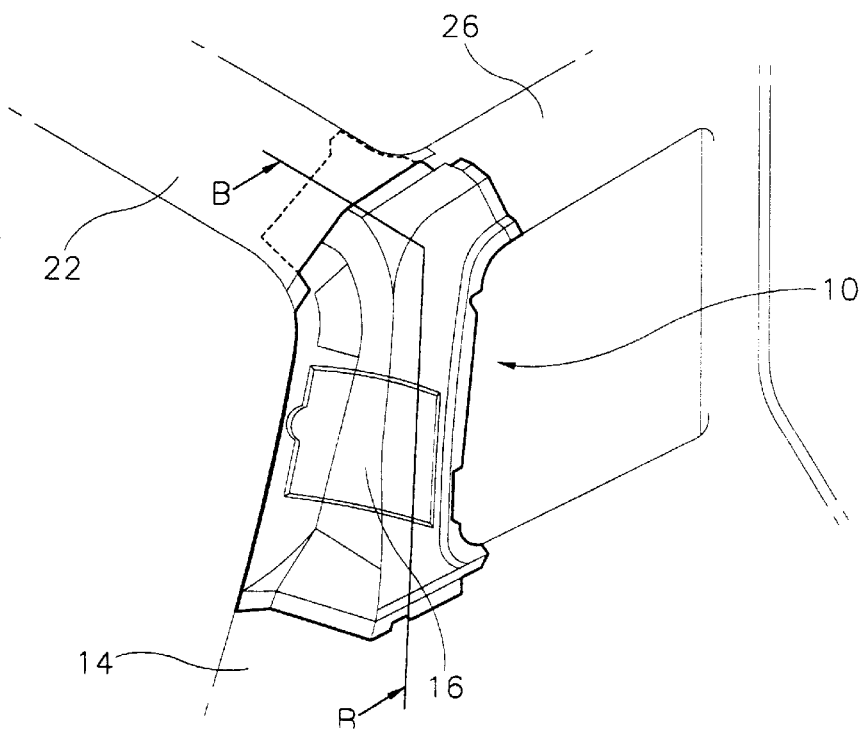
FIG. 4 is a perspective view, showing the interior structure of a rear pillar of this invention designated by the circled portion C of FIG. 1.
Figure 3:
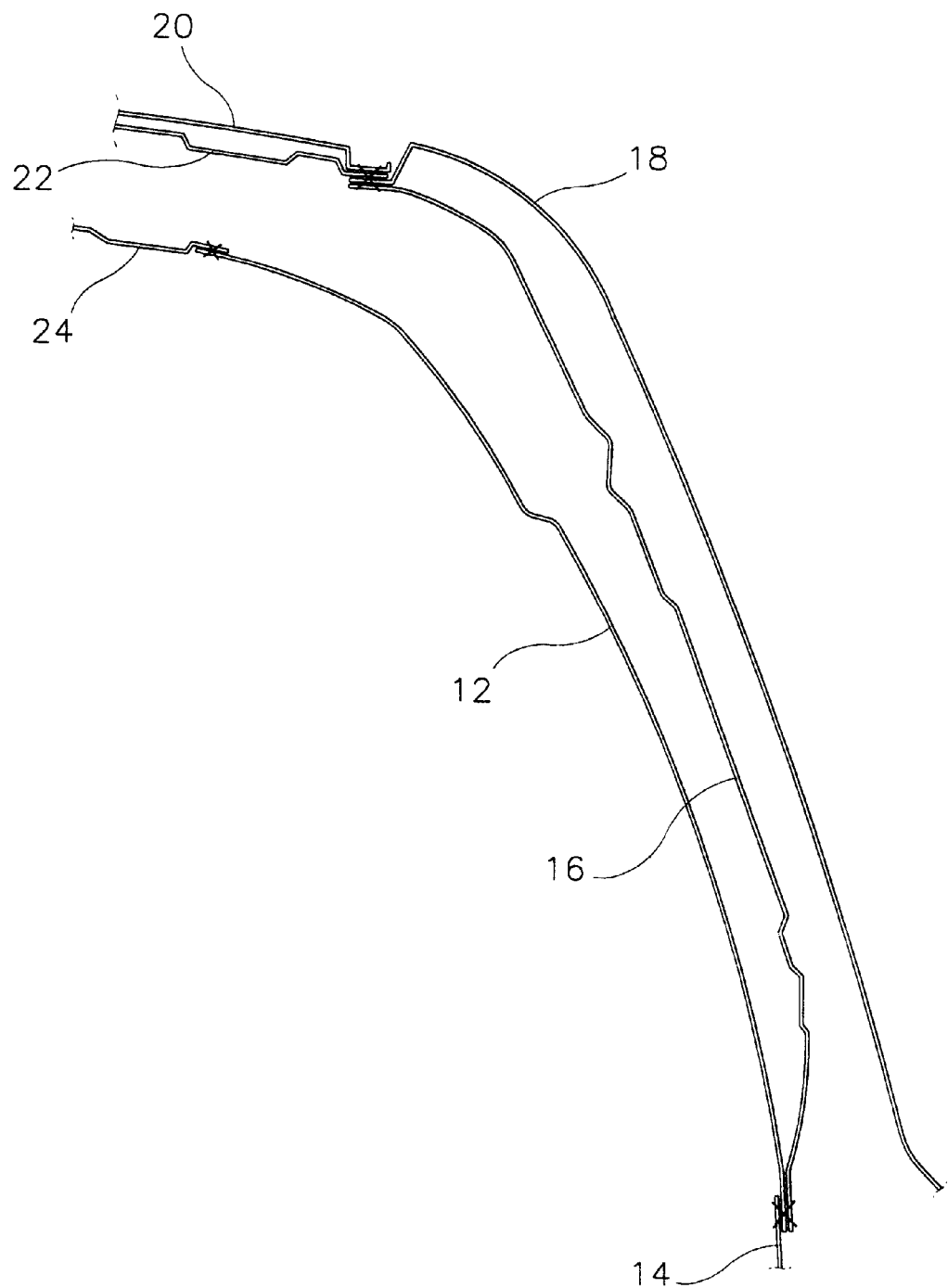
FIG. 3 is a sectional view taken along the line A—A of FIG. 2.
Figure 5:
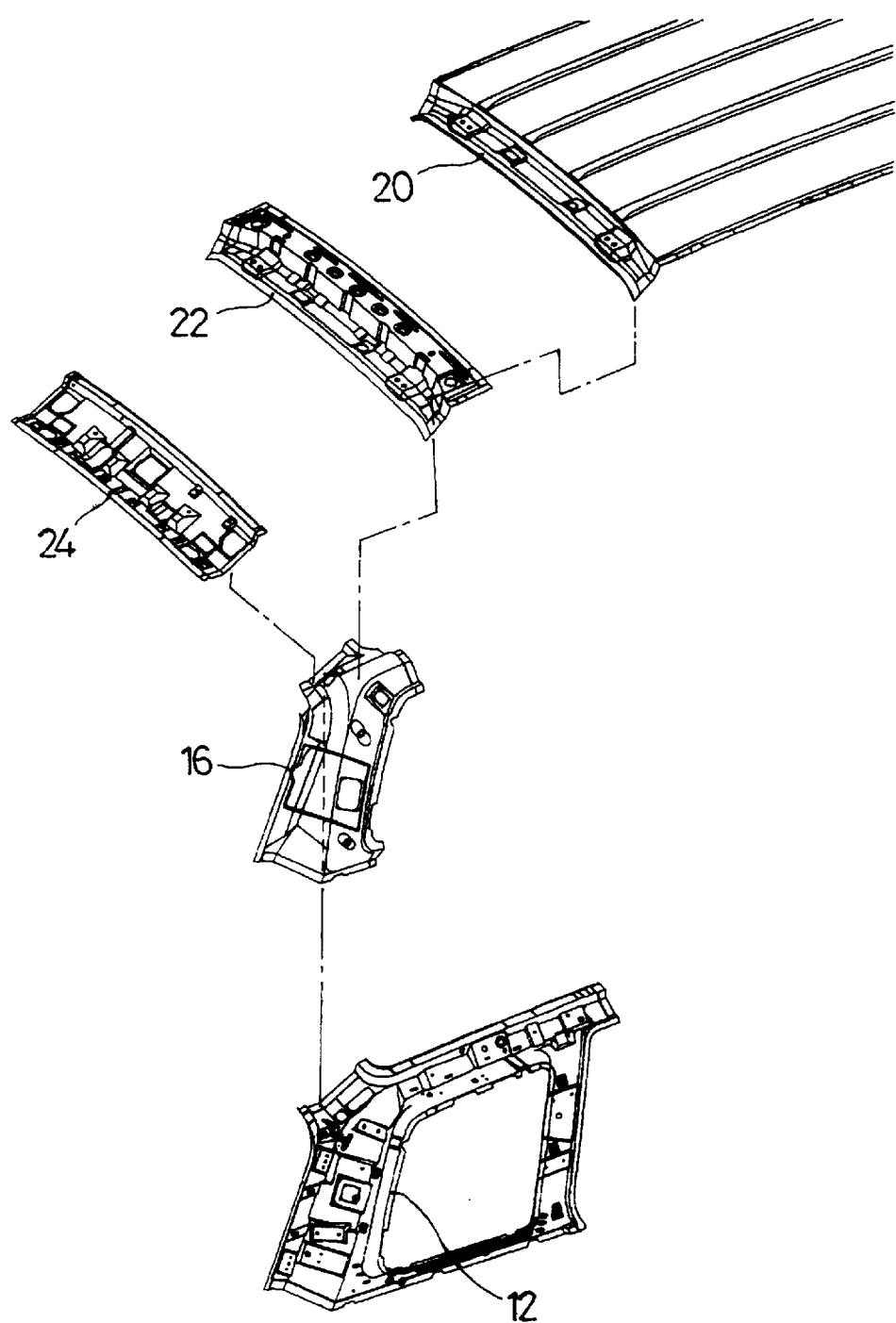
FIG. 5 is an exploded perspective view of the rear pillar of this invention.
Figure 6:
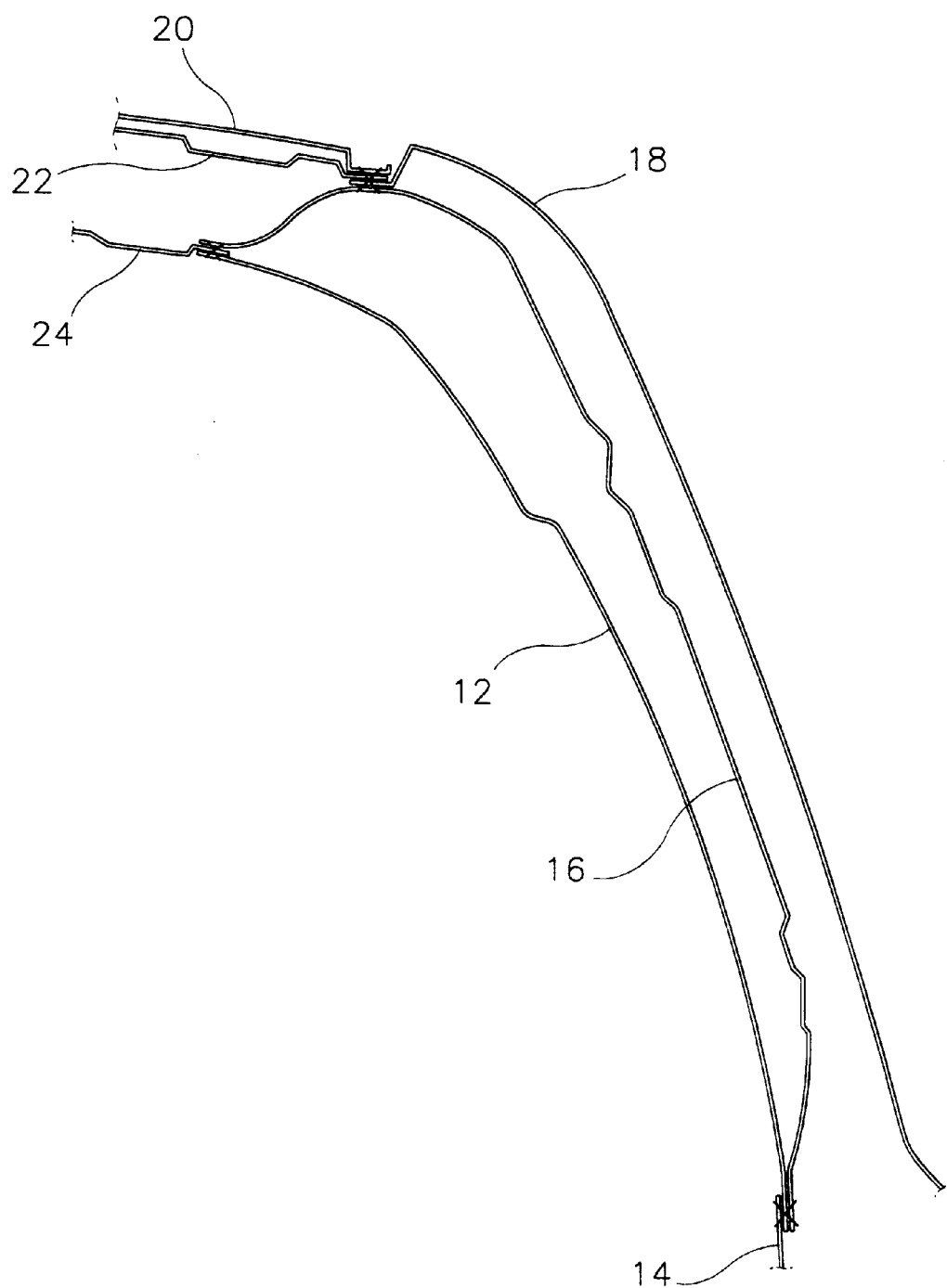
FIG. 6 is a sectional view taken along the line B—B of FIG. 4.

FIG. 4 is a perspective view, showing the interior structure of a rear pillar, having a reinforcement structure of this invention and designated by the circled portion C of FIG. 1. FIG. 5 is an exploded perspective view of the rear pillar of this invention. FIG. 6 is a sectional view taken along the line A—A of FIG. 4. In the reinforcement structure of this invention, most of the elements are common with those of the conventional structure of FIGS. 1 to 3. Those elements common to both the conventional structure and the structure of this invention will thus carry the same reference numerals.

As shown in the drawings, two longitudinal rear pillars 10 upwardly extend at opposite sides of the body's rear portion having an openable rear hatch T. Each of the rear pillars 10 comprises an inside upper quarter panel 12 and an outside lower quarter panel 14, which extend upwardly while being integrated together into a single body at ends thereof through a welding process. A reinforcing panel 16 extends upwardly while being spaced apart from the external surface of the inside upper quarter panel 12 and is integrated with the welded junction of the two quarter panels 12 and 14 at its lower end. The upper end portion of the reinforcing panel 16 is integrated with the upper end of a side panel 18. The upper end of the reinforcing panel 16 is integrated with the upper end of the inside upper quarter panel 12 through a welding process, with a rear lower roof rail 22 being welded to the junction between the inside upper quarter panel 12 and the reinforcing panel 16.

In such a case, the rear upper roof rail 22 is welded to the external surface of the reinforcing panel 16 at a position spaced apart from the upper end of the panel 16. In addition, a roof panel 20 is externally integrated with the welded junction between the reinforcing panel 16 and the rear upper roof rail 22.

That is, the lower end of the reinforcing panel 16 is integrated with the welded junction between the lower end of the inside upper quarter panel 12 and the upper end of the inside lower quarter panel 14 at the outside of the inside upper quarter panel 12. On the other hand, the upper end of the reinforcing panel 16 is integrated with both the upper end of the inside upper quarter panel 12 and one end of the rear lower roof rail 24 while forming a closed cavity within the rear pillar 10.

In the structure of this invention, the upper end of the reinforcing panel 16, installed inside the side panel 18 within each rear pillar 10 of an automobile's body having a rear hatch T, is welded to the end of the rear lower roof rail 24 along with the inside upper quarter panel 12 while forming a desired closed cavity within the rear pillar 10. Therefore, this reinforcement structure does not allow noise to be transmitted from tires of wheels to the channel between the rear upper and rear lower roof rails 22 and 24 through the channel between the inside upper quarter panel 12 and the reinforcing panel 16 during operation of an automobile. It is thus possible to accomplish a desired reduction in operational noise during operation of the automobile and to allow passengers within the passenger compartment to feel comfortable.

In addition, the reinforcing panel 16 of the rear pillar 10 is firmly welded to the rear lower roof rail 24 into a single body, thus providing a desired structural strength required to effectively support the hinge members for a raise or lower type rear hatch T. Therefore, the reinforcement structure of this invention almost completely solves the problem, which has been experienced in the conventional rear pillars 10 having a weak connection structure between the reinforcing panel 16 and the rear lower roof rail 24 and being not suitable for supporting such a raise or lower type rear hatch T.

As described above, the present invention provides a reinforcement structure for a rear pillar of automobiles. In this reinforcement structure, the reinforcing panel, arranged in the space defined between the inside upper quarter panel and the side panel of the rear pillar, is integrated with the welded junction between the inside upper quarter panel and the rear lower roof rail at its upper end. On the other hand, the lower end of the reinforcing panel is integrated with the welded junction between the inside upper quarter panel and the inside lower quarter panel. The reinforcing panel thus forms a closed cavity within the rear pillar and intercepts effectively noise transmitted from tires of wheels into the passenger compartment through the rear pillars during operation of an automobile. The passengers within the passenger compartment are thus allowed to feel comfortable. In addition, the reinforcing panel gives a desired structural strength to the body's rear portion and allows the support hinge members for a conventional raise or lower type rear hatch to be effectively supported by the rear portion. Therefore, the reinforcement structure of this invention allows such a rear hatch to be preferably used in an automobile body having such rear pillars.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reinforced pillar structure automobile with a reinforcing panel extending in a space defined between an inside upper quarter panel and a side panel and integrated with a lower end of the inside upper quarter panel at its lower end, and integrated with an upper end of said side panel at its upper end portion, wherein said upper end portion of the reinforcing panel further extends to a position around an upper end of said inside upper quarter panel and is integrated with the upper end of the inside upper quarter panel while forming a closed cavity within the rear pillar.

2. The reinforced structure according to claim 1, wherein said upper end of the reinforcing panel is integrated with the upper end of said inside upper quarter panel along with one end of a roof rail.

* * * * *